UNITED STATES PATENT OFFICE.

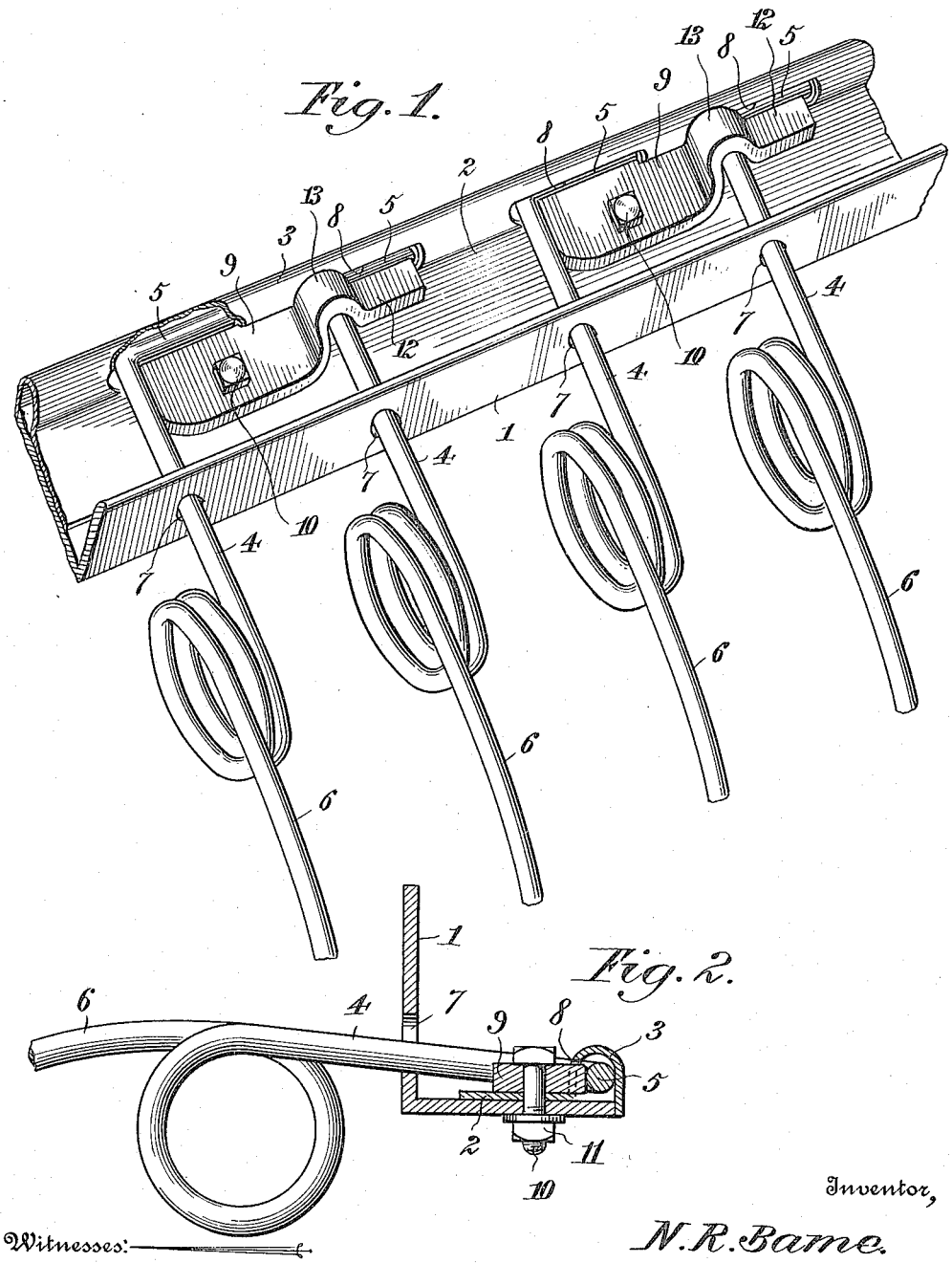

NOAH R. BAME, OF ANACONDA, MONTANA.

AGRICULTURAL IMPLEMENT.

1,145,963.　　　　　Specification of Letters Patent.　　Patented July 13, 1915.

Application filed August 29, 1914. Serial No. 859,205.

*To all whom it may concern:*

Be it known that I, NOAH R. BAME, a citizen of the United States, residing at Anaconda, in the county of Deerlodge, and State of Montana, have invented new and useful Improvements in Agricultural Implements, of which the following is a specification.

This invention relates to agricultural implements and more particularly to means for securing rake teeth. It hitherto has been the practice to mount a bank of rake teeth upon a holding member in such a way that, while it was designed to permit of the removal of the several rake teeth, the same could not be effected without dislodging the remaining teeth, a practice which was found to be very inconvenient and unsparing of time.

It is the leading feature of my invention to provide simple, efficient, and inexpensive means for securing the several rake teeth in position upon a support, said support being adapted to removably hold each rake tooth whereby to permit of the ready removal of one or more of the rake teeth for the purpose of renewal or repair, without effecting the position or dislodgment of the remaining rake teeth.

With the above and other objects in view my invention consists in the combination, arrangement, and details of construction disclosed in the drawings and specification, and then, more particularly pointed out in the appended claim.

In the drawings, wherein similar reference characters refer to similar parts throughout the respective views, Figure 1 illustrated is a perspective view of my invention, partly broken away. Fig. 2 is a transverse view of my invention, partly in section.

In the drawing, which is merely illustrative of my invention 1 designates a suitable angle iron bar adapted to be secured upon an agricultural implement in a manner well known to those skilled in the art. A rigid anchor plate 2 is adapted to be secured upon said bar 1 as will hereinafter be set forth. Said anchor plate 2 is provided at one edge with an outstruck bead 3 disposed substantially in a plane at right angles to the body of said plate. A plurality of rake shanks 4 are provided with terminal crooks 5 at one end and with suitably shaped rake teeth 6 at their opposite ends, said shank being designed to project through a series of elongated openings 7 formed in the angle iron bar 1. Said openings are made of such a size as to admit of the shanks moving freely therein.

It is designed that the crooks 5 of the rake shanks 4 shall be snugly received into the outstruck bead 3, being passed through a series of slots or openings 8 formed upon said bead in a plane with the body portion of the anchor plate 2 so that said crooks may slide freely into the slots 8. In order to hold the several rake shanks 4 in proper relation retainer members 9 consisting of rigid fastenings, are provided, each of said members 9 being held in overlying position upon the plate 2 by any suitable securing element such as the threaded bolts 10 which are tapped through said members, said plate 2 and bar 1 respectively, nuts 11 engaging the free projecting ends of said bolts to hold the latter against displacement and said members 9 in position.

It will be noted that each of the members 9 is provided at one end with a shoulder or ledge 12 which may project, if desired, into any of the slots 8. The members 9 bear at one end against certain of the rake shanks 4 and are adapted to keep the remaining rake shanks in position to prevent the displacement of the crooks 5 from the bead 3 by means of the integral loop 13 with which each of said members 9 is provided as will be obvious.

When it is desired to remove any of the rake teeth 6 the nut will be removed from the bolt 10 and then the member 9 may be removed from the plate 2, whereupon the crook 5 of the shank may be removed from its opening 8 and then said crook may be passed out of the opening 7 formed in the angle iron bar 1 in an obvious manner. It will thus be noticeable that while one member 9 is removable the other members may remain in set position thereby leaving the other rake teeth undisturbed.

From the above the advantages flowing from the use of my invention will be obvious. Numerous modifications may be resorted to in practice without departing in principle from the details of construction disclosed herein.

What I desire to claim and secure by Letters Patent is:—

A rake bar angular in cross section and having one side portion provided with openings, a plate mounted upon the other side portion of the bar and having an outstanding bead provided with slots, teeth passing through said openings and said slots and having crooked terminals lying under the said bead, and members mounted upon the plate and extending along the slots in the bead and retaining said crooked terminals of the teeth in the bead.

In testimony whereof I affix my signature in presence of two witnesses.

NOAH R. BAME

Witnesses:
JEANETTE KELLEY,
T. F. SHEA.